United States Patent [19]

Bownds

[11] Patent Number: 4,802,702

[45] Date of Patent: Feb. 7, 1989

[54] MAGNETIC LIFTING TOOL

[76] Inventor: Royce D. Bownds, 411 N. Ave. E., Denver City, Tex. 79323

[21] Appl. No.: 166,398

[22] Filed: Mar. 10, 1988

[51] Int. Cl.[4] .......................... B25J 15/06; B66C 1/04

[52] U.S. Cl. .................................. 294/65.5; 294/19.1

[58] Field of Search ............................ 294/19.1, 65.5; 335/285, 291-294, 302, 303; 403/108, 109, 377-379

[56] References Cited

U.S. PATENT DOCUMENTS

| | | | |
|---|---|---|---|
| 1,347,382 | 7/1920 | Karro | 294/65.5 |
| 2,269,458 | 1/1942 | Kahn | 294/65.5 X |
| 2,628,122 | 2/1953 | Collins et al. | 294/65.5 |
| 2,947,563 | 8/1960 | Stitt | 294/65.5 |
| 2,976,075 | 3/1961 | Budreck | 294/65.5 |
| 3,317,997 | 5/1967 | Hedstrom et al. | 294/19.1 X |
| 3,384,408 | 5/1968 | Furzey | 294/65.5 |
| 3,924,115 | 12/1975 | Hampton et al. | 294/65.5 X |
| 4,105,239 | 8/1978 | Akczinski | 294/65.5 |

FOREIGN PATENT DOCUMENTS

| | | | |
|---|---|---|---|
| 929300 | 6/1955 | Fed. Rep. of Germany | 294/65.5 |

*Primary Examiner*—Johnny D. Cherry
*Attorney, Agent, or Firm*—Leon Gilden

[57] ABSTRACT

A magnetic lifting tool is set forth for use in cleanup and removal of ferrous metals from construction sites, such as nails and the like. A circular lifting plate includes a plastic housing with an included steel pickup surface which has secured thereto a multi-adjustable handle for accommodating various statures of users of the tool. A permanent or electromagnet insert is positioned between the pickup surface and housing for providing magentic lifting force. The circular housing eases manipulation of the tool about a construction site surface.

5 Claims, 5 Drawing Sheets

MAGNETIC LIFTING TOOL

BACKGROUND OF THE INVENTION

1. Field of the Invention

The field of invention relates to pickup tools and more particularly pertains to a new and improved magnetic pickup which provides adjustment for accommodation of varying statures of individuals and includes a selectively operative electromagnetic or permanent magnet pickup head effective through a metallic pickup surface.

2. Description of the Prior Art

The use of magnets and the like for the lifting of ferrous metals is well known in the prior art. As may be appreciated, these devices have normally been ill suited for the effective lifting and removal of debris resulting in a construction site. The typical elongate structure of such devices has limited manipulation and maneuvering of such devices over a surface for the removal of ferrous metal debris. For example, U.S. Pat. No. 2,242,880 to Lisle illustrates the positioning of a metallic plug within a crankcase oil pan of an automotive engine for the attraction of ferrous debris within the crankcase oil pan area. The Lisle patent, while of a remote structure and purpose, is useful in illustrating the positioning of a magnetic tool for the attraction of ferrous debris.

U.S. Pat. No. 2,417,762 to Koller illustrates the use of a magnetic lifting tool wherein a magnetic reciprocating piston is surroundingly covered with a non-metallic covering that may be withdrawn into a cylindrical area for the removal of debris picked up by the magnetic core. The Koller patent is of interest relative to the use of a magnetic lifting tool, but is of a typical elongate cylindrical construction limiting the effectiveness of such a tool in attempted manipulation about a debris-strewn surface, as in a construction site.

In U.S. Pat. No. 2,954,257 to Besuch a rectangular metallic pickup surface is utilized with a plurality of magnets therein for the lifting of various articles. The configuration of the Besuch patent is comparable to other prior devices of this configuration wherein a relatively thin cylindrical surface has been found to be expedient in the lifting of debris from about a construction site surface.

U.S. Pat. No. 8,228,729 to Jordan discloses the use of a cap securable to a hammer that may be positioned proximate nails and the like for securement of such nails for the convenience of a carpenter or the like utilizing such nails.

U.S. Pat. No. 4,554,703 to Matuki utilizes a magnet positioned at a terminal end opposed from that of an eraser for the lifting of magnetic-like debris created by the use of the eraser. While a useful tool in the environment of the Matuki patent. The device is of remote utility in a construction site environment.

As such, there is a continuing need for a new and improved magnetic lifting tool which addresses both the problem of effectiveness and adjustability, and in this respect, the present invention substantially fulfills this need.

SUMMARY OF THE INVENTION

In view of the foregoing disadvantages inherent in the known types of magnetic lifting tool now present in the prior art, the present invention provides an magnetic lifting tool wherein the same may be effectively manipulated about a construction site surface and may be further easily and efficiently adjusted accommodating various statures of users thereof. As such, the general purpose of the present invention, which will be described subsequently in greater detail, is to provide a new and improved magnetic lifting tool which has all the advantages of the prior art magnetic lifting tools and none of the disadvantages.

To attain this, the present invention comprises a magnetic lifting tool which may be efficiently and easily manipulated about a construction site surface during periods of use in removal of ferrous metal debris. A telescoping handle assembly positions an associated "L" shaped handle with respect to a circular relatively thin magnetic face to accommodate varying human stature requirements and enable effective positioning throughout a construction site. An included permanent or alternative electromagnetic unit is positioned within a plastic-like housing formed with a metallic pickup surface face for enhancement of the magnetic effect about the face.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved magnetic lifting tool which has all the advantages of the prior art magnetic lifting tools and none of the disadvantages.

It is another object of the present invention to provide a new and improved magnetic lifting tool which may be easily and efficiently manufactured and marketed.

It is a further object of the present invention to provide a new and improved magnetic lifting tool which is of a durable and reliable construction.

An even further object of the present invention is to provide a new and improved magnetic lifting tool which is susceptible of a low cost of manufacture with regard to both materials and labor, and which accordingly is then susceptible of low prices of sale to the consuming public, thereby making such magnetic lifting tools economically available to the buying public.

Still yet another object of the present invention is to provide a new and improved magnetic lifting tool which provides in the apparatuses and methods of the prior art some of the advantages thereof, while simultaneously overcoming some of the disadvantages normally associated therewith.

Still another object of the present invention is to provide a new and improved magnetic lifting tool formed with a circular pickup face positioned at a terminal end surface of a relatively thin cylindrical housing.

Yet another object of the present invention is to provide a new and improved magnetic lifting tool formed with a readily adjustable handle for adjustment to varying statures of individuals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
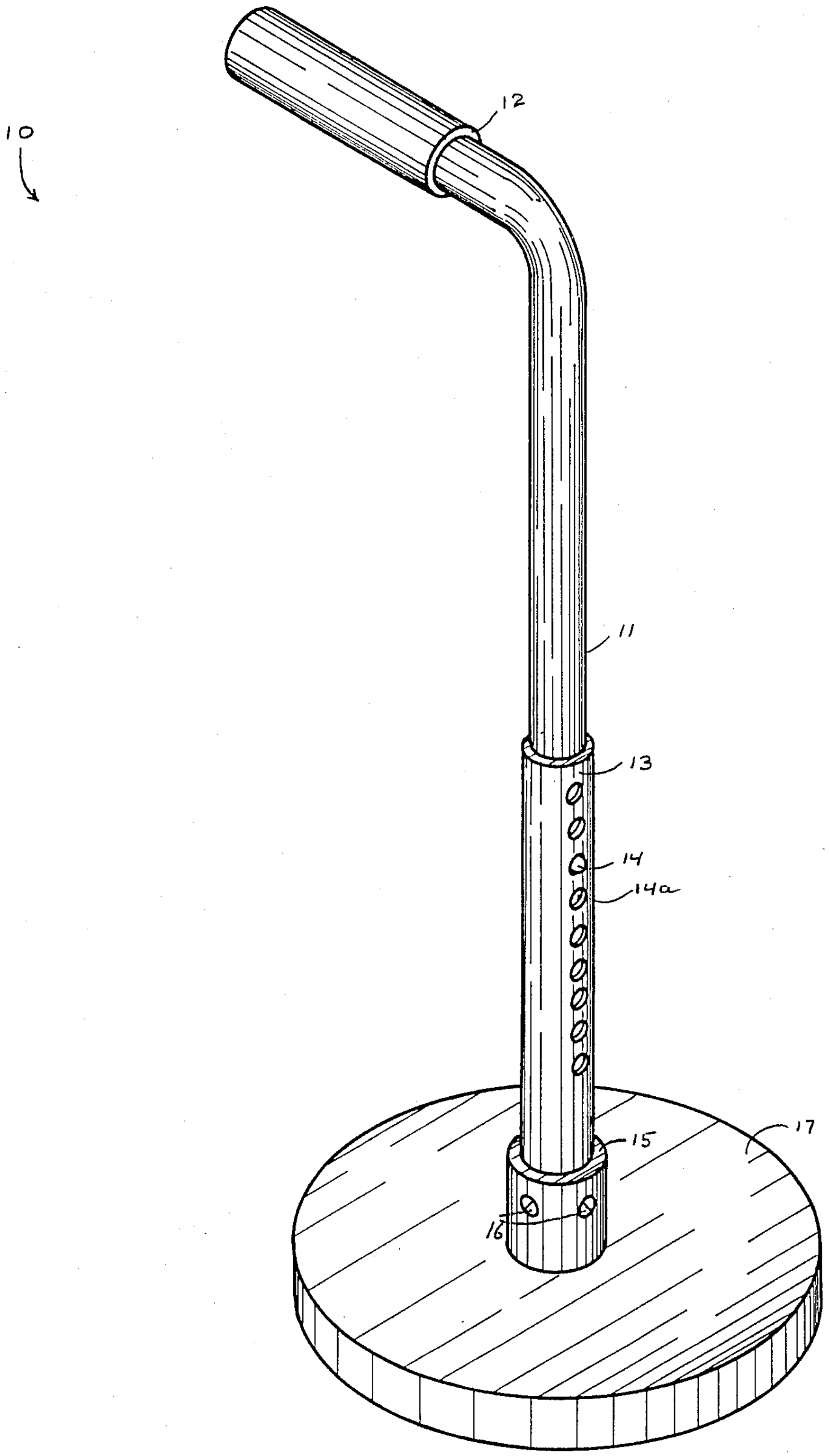
FIG. 1 is an isometric illustration of the instant invention.
Figure 2:
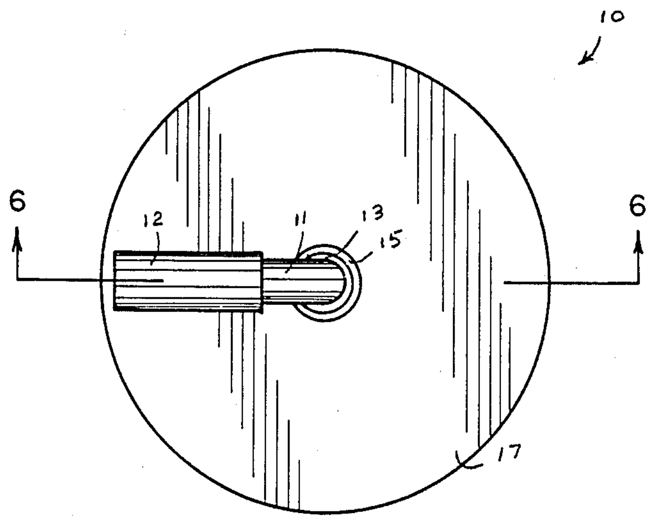
FIG. 2 is a top orthographic view of the instant invention.
Figure 3:
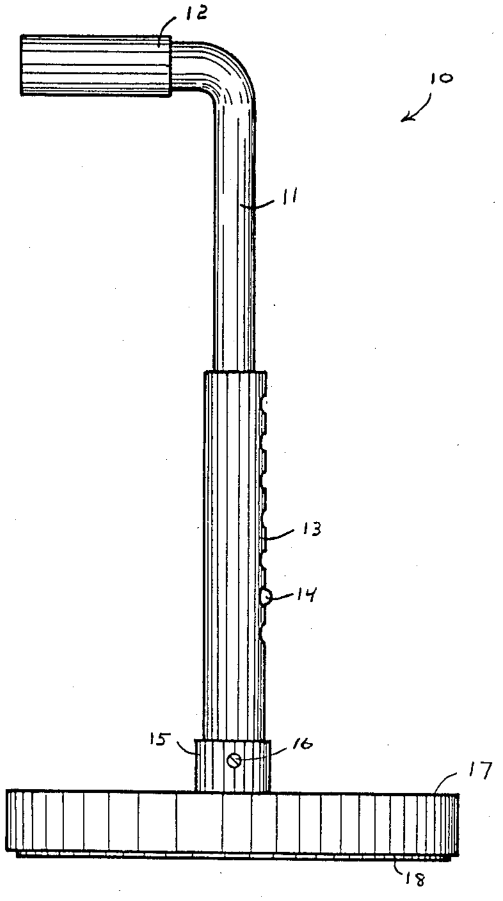
FIG. 3 is an orthographic view taken in elevation of the instant invention.

With reference now to the drawings, and in particular to FIGS. 1 to 7 thereof, a new and improved magnetic lifting tool embodying the principles and concepts of the present invention and generally designated by the reference numeral 10 will be described.

More specifically, it will noted that the magnetic lifting tool apparatus 10 essentially comprises an elongate vertically oriented "L" handle 11 secured at a terminal end of the "L" shape portion with a frictional grip 12. The "L" shaped handle 11 is interfitted with an axially aligned elongate securement sleeve 13 formed with a plurality of axially aligned openings 14*a* for acceptance of a resilient detent 14. A socket 15 integrally formed to the plastic-like housing 17 of the lifting tool accepts therein the securement sleeve 13 and is fastened thereto by a plurality of removable fasteners 16. The cylindrical plastic-like housing 17 is of a length of approximately one inch and of a diameter of approximately six inches to effect a one/six depth to diameter ratio. This ratio has been found to be effective in the manual manipulation and maneuvering of the magnetic lifting tool 10 about a debris strewn construction site where typically man ferrous-like articles are resultant from the construction process, such as nails, staples, and the like.

Pickup surface face 18 of the magnetic lifting tool 10 is formed of a steel alloy and is interfitted within the plastic-like housing 17 to create a more effective surface about which the magnetic field may act through to enhance its effectiveness and surface area of contact and attraction.

Figure 6:
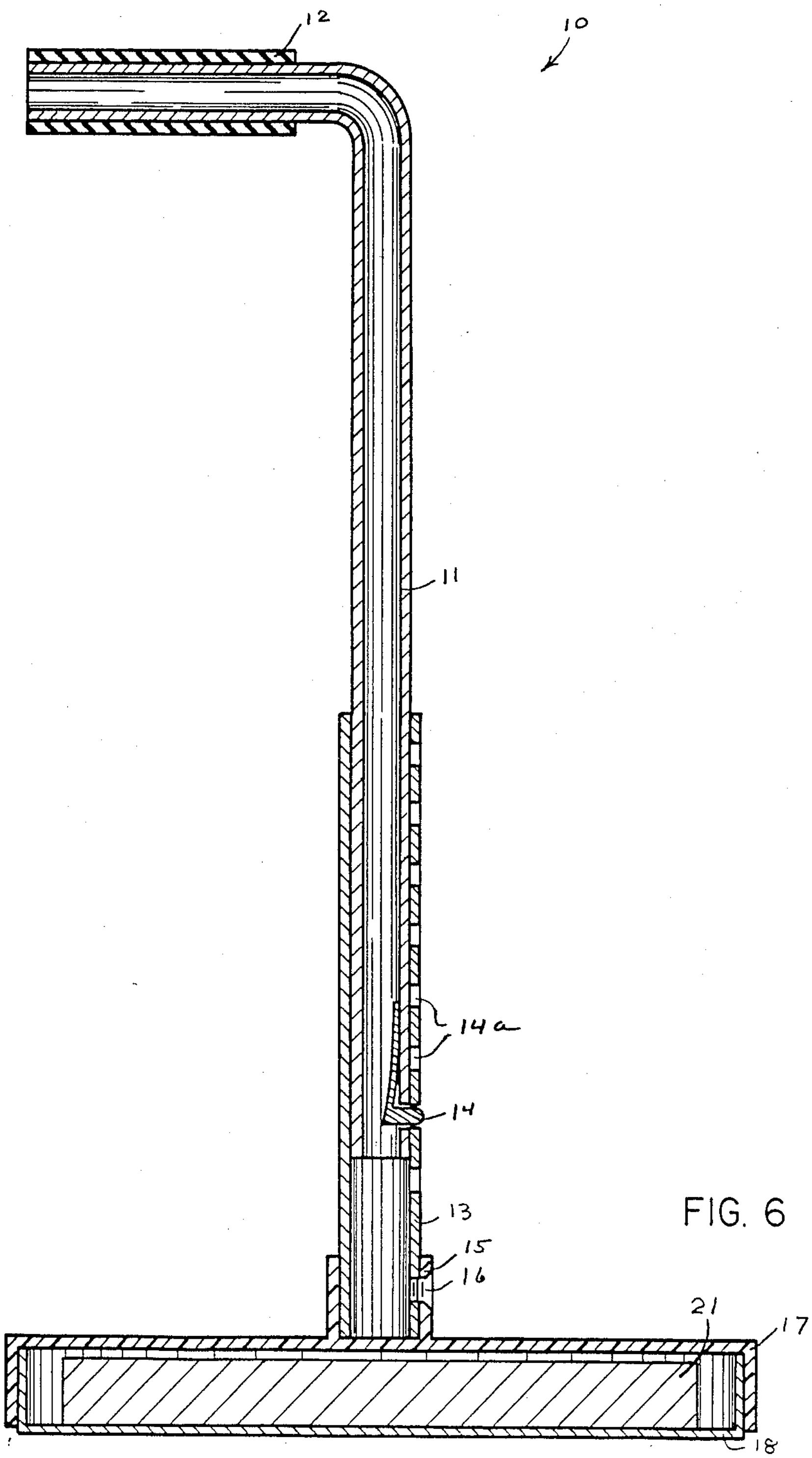
FIG. 6 is an orthographic side view taken along the lines 6—6 of FIG. 2.

FIG. 6 illustrates a cross-section of the magnetic lifting tool 10 formed with a permanent magnet 21 secured within plastic-like housing 17 contiguously joined to the magnetic pickup surface face 18, as described above.

Figure 4:
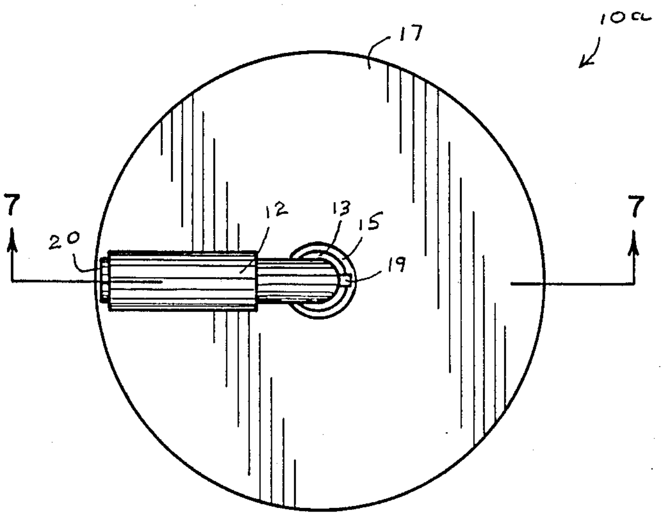
FIG. 4 is a top orthographic view of a modification of the instant invention.
Figure 5:
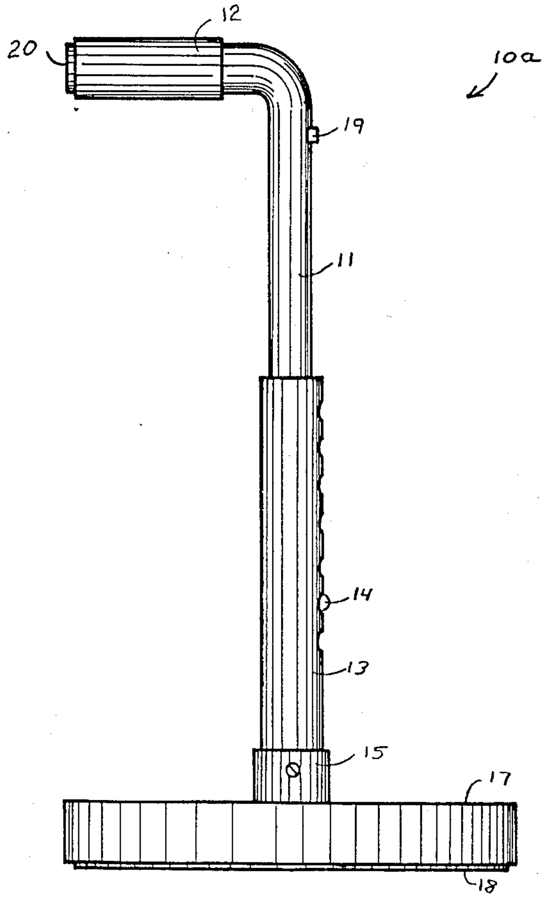
FIG. 5 is an orthographic view taken in elevation of a modification of the instant invention.
Figure 7:
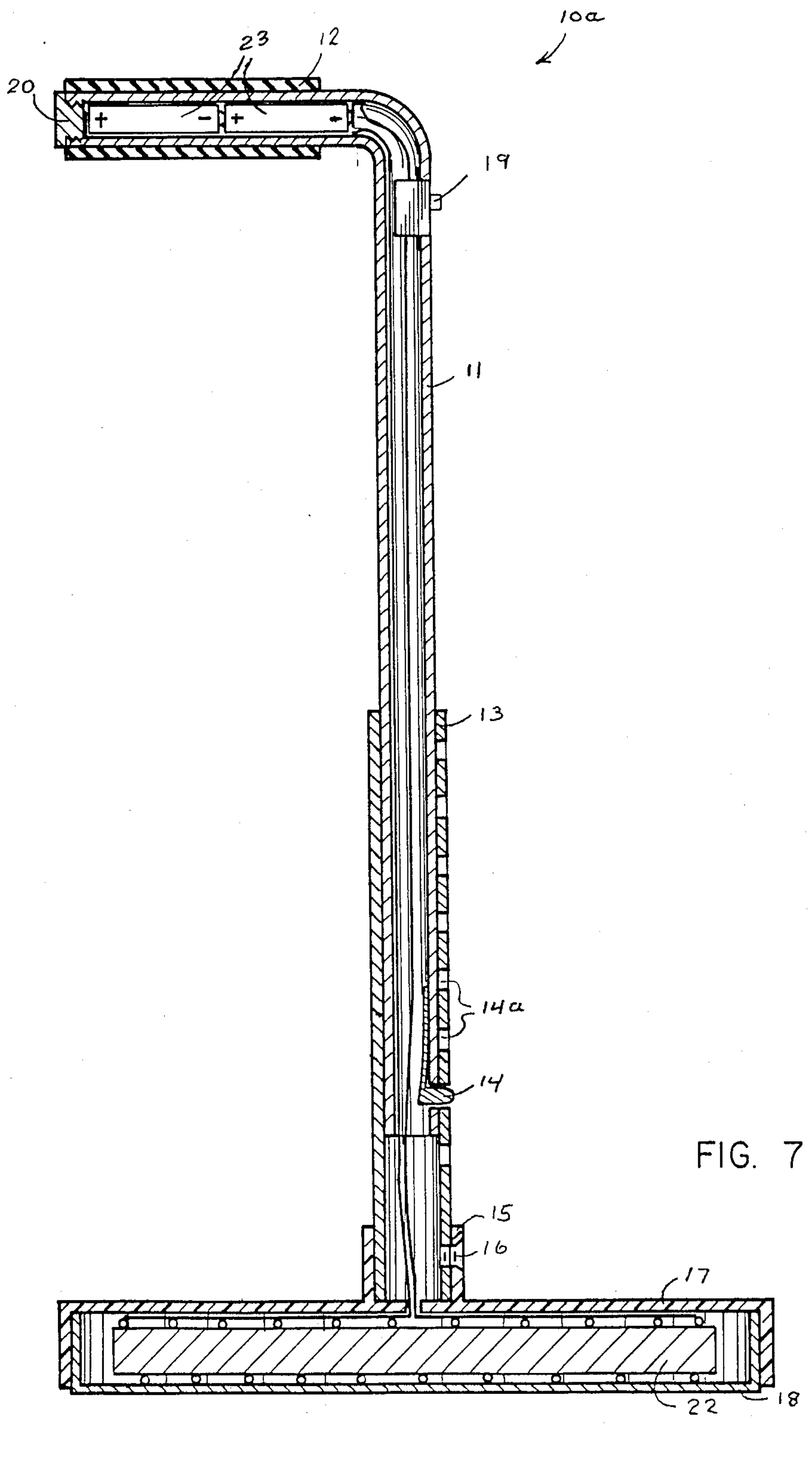
FIG. 7 is an orthographic side view taken along the lines 7—7 of FIG. 4.

FIGS. 4 and 5 are illustrative of a modification of the lifting tool wherein a magnetic lifting tool utilizes an electromotive force, depicted as 10*a* in FIGS. 4, 5 and 7. In this embodiment, the magnet is in the form of electromagnet 22 to enable selective use thereof by means of an on/off switch 19 positioned proximate the frictional grip 12 wherein a plurality of batteries 23 are replaceably positionable and accessible by means of a threadedly removable end cap 20.

As to the manner of usage and operation of the present invention, the same should be apparent from the above description. Accordingly, no further discussion relative the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A magnetic lifting tool for use in removing ferrous debris, said tool comprising:
   - an "L" shaped handle including an elongate hollow vertical leg and a hollow vertical leg and a horizontal leg of lesser extent than said vertical leg, and
   - a hollow securement sleeve slidably secured to said handle along a first extent portion of said sleeve and fixedly secured to housing means along a second extent portion of said sleeve, said first and second extent portions of said sleeve spaced at opposite ends of said sleeve, and
   - said housing means including a cylindrical housing of a first diameter and socket of a second diameter directed upwardly of said housing means accepting said securement sleeve, and a magnetic means for magnetically attracting ferrous debris secured within said housing means, and wherein said horizontal leg includes a frictional grip encompassing a majority of a surface defined by said horizontal leg, and wherein said securement sleeve is formed with a series of axially spaced openings cooperative with a resilient detent secured within said vertical leg and projecting through an opening in said vertical leg to cooperative with one of said spaced openings, and wherein said socket is of a diameter to accept said securement sleeve therein including a plurality of fasteners to secure said securement sleeve with said socket, and wherein said first diameter is six inches and said housing means of a height of one inch to define a six to one ratio of said first diameter to said height, and wherein said housing means includes a working surface formed of a magnetically attractive metal, and said surface formed along and defining a lowermost face of said housing, and an upper surface and sides of said housing means formed of plastic-like material.

2. A magnetic lifting tool as set forth in claim 1 wherein said magnetic means is a permanent magnet.

3. A magnetic lifting tool as set forth in claim 1 wherein said magnetic means is an electromagnet.

4. A magnetic lift tool as set forth in claim 3 wherein said horizontal leg has a terminal and including a threadedly removable plug for removably positioning battery means therein for supplying power to said electromagnet.

5. A magnetic lifting tool as set forth in claim 4 wherein a switch is positioned adjacent an apex formed by said vertical and horizontal legs for selectively activating said electromagnet.

* * * * *